July 2, 1963   E. K. HINE   3,095,939
GUIDANCE APPARATUS
Filed April 13, 1960   4 Sheets-Sheet 1

----- PROGRAMED GUIDANCE
——— AUTOMATIC GUIDANCE

INVENTOR
EDWARD K. HINE
BY
ATTORNEYS

July 2, 1963

E. K. HINE 3,095,939

GUIDANCE APPARATUS

Filed April 13, 1960

INVENTOR
EDWARD K HINE

BY

ATTORNEYS

July 2, 1963

E. K. HINE 3,095,939

GUIDANCE APPARATUS

Filed April 13, 1960

INVENTOR
EDWARD K. HINE

BY

ATTORNEYS

July 2, 1963  E. K. HINE  3,095,939
GUIDANCE APPARATUS
Filed April 13, 1960  4 Sheets-Sheet 4

INVENTOR
EDWARD K. HINE

United States Patent Office 3,095,939
Patented July 2, 1963

---

3,095,939
GUIDANCE APPARATUS
Edward K. Hine, North Caldwell, N.J.
(Avery Road, Garrison, N.Y.)
Filed Apr. 13, 1960, Ser. No. 21,923
8 Claims. (Cl. 180—79.1)

This invention relates to guidance control apparatus for automotive vehicles, and more particularly, to automatic guidance or steering control apparatus for ground-borne automotive vehicles.

A principal feature of the present invention is the provision of an automatic guidance servo-mechanism which is adapted to steer an automotive vehicle along a prescribed ground path defined by an electrically detectable ground trace. In accordance with one aspect of the invention means are provided on the guided vehicle for continuously producing a new displaced guidance trace adjacent and substantially parallel to an existing controlling trace. Given an initial peripheral area-defining trace, the guidance apparatus provided by the invention automatically steers (unattended) an automotive vehicle over a defined area following a self generated spiral trace.

A further feature of the invention resides in the provision of an automatic guidance system for an automotive vehicle which, when confronted with surface obstructions or depressions, logically transfers vehicle guidance control from an automatic closed-loop trace following servo-mechanism to an open-loop pre-programed servo-mechanism. The guidance system of this invention is thereby endowed with sufficient logic to enable it to recognize certain specific obstructions, etc. and accordingly choose an appropriate vehicle guidance program to effect a desired partial circumnavigation of the obstruction before returning to the automatic trace-following mode of operation.

Other features and advantages of the invention will become apparent from the following description of a preferred embodiment of the invention taken in connection with the accompanying drawings, in which.

Figure 1:
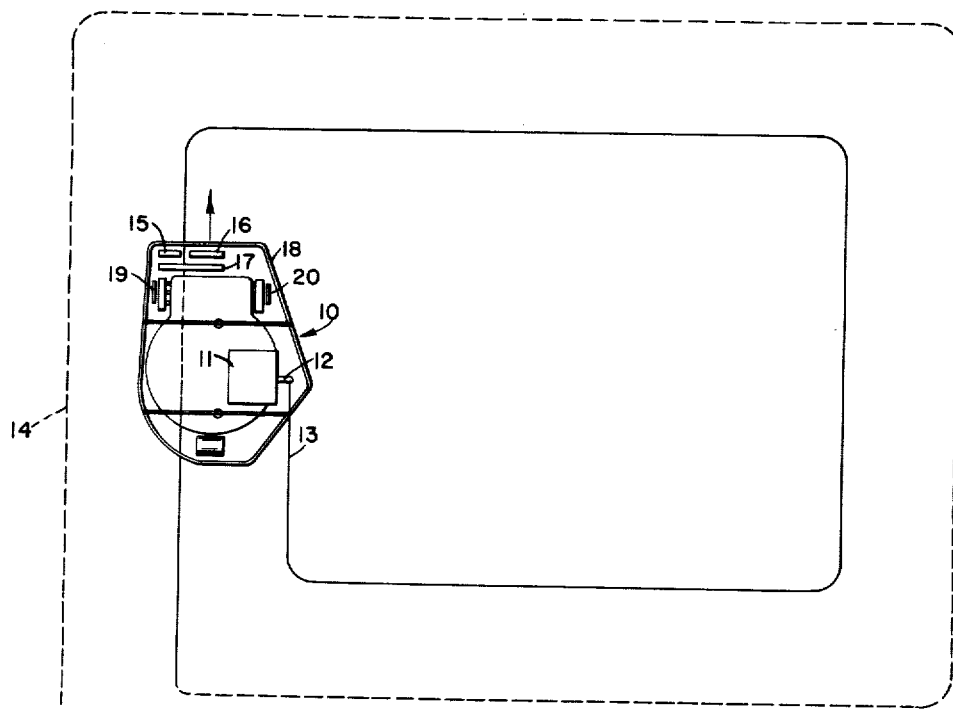
FIG. 1 is a plan view showing the ground path followed by a self-powered lawnmower equipped with guidance apparatus provided by the invention.

It will be apparent to those skilled in the art, from the discussion which follows, that the apparatus of the present invention is not limited in its use to the guidance of any one particular automotive vehicle but rather can be employed to automatically steer a wide variety of ground-borne vehicles. In accordance with the general teachings of the invention, a narrow trace of electrically detectable material is deposited on the ground to provide a desired guidance trace. A liquid material such as water is advantageously employed to provide a fugitive type ground trace, however any flowable material which will produce an electrically detectable trace may be satisfactorily employed. A flowable material such as water may be used to produce an electrically conductive trace on the ground surface or a weak radio-active tracer may be added to produce a fugitive radiation type trace. Apparatus is provided to symmetrically sense soil conductivity or radiation on each side of the deposited trace and control signals, corresponding to lateral movement of the vehicle with respect to the trace, are accordingly developed to automatically steer the vehicle along the desired path-defining trace.

Although the preferred embodiment of the invention shown in the drawings and described below produces and follows an electrically conductive trace, it will be apparent to those skilled in the art that it is a simple matter to modify the electrical sensing circuits to measure changes in the conductivity of radiation sensing ionization chambers, for example, instead of changes in soil conductivity.

Referring to FIG. 1, there is shown generally a power-driven lawnmower 10 equipped to operate with the automatic guidance apparatus provided by the invention. A water supply tank 11 is mounted on the mower and a nozzled pipe 12, connected to the tank, is provided to deposit a narrow trace of water 13 along the ground surface as the mower moves in the indicated forward direction. A chemical such as salt or soda may be advantageously added to the water to increase the electrical conductivity of the trace. In a normal lawn-mowing operation, the vehicle is initially manually steering around the outer-most periphery of the area to be mowed in order to establish a boundary defining trace 14 (shown dotted). Thereafter the guidance apparatus is switched to the automatic mode of operation and the mower is caused to follow the initial boundary trace unattended. As the mower follows the given boundary trace, it simultaneously deposits a new adjacent guidance trace substantially parallel to the controlling trace and displaced inwardly from the boundary trace by the width of the mower. The mower thereby automatically mows the entire given area by following a self-produced guidance trace which spirals inwardly as shown.

It will be apparent to those skilled in the art that the mower may be operated in a counter-clockwise direction starting initially with a small area defining trace located in the center of the given area. In similar manner the mower automatically mows the given area by following a self-produced guidance trace which spirals outwardly from the center.

Left and right ground sensing probes 15 and 16, respectively, function co-operatively with a common ground probe 17 to sense changes in soil conductance. A guard ring 18, pivotally mounted on the mower, is mechanically linked to specific servo-mechanism control switches which function logically to steer the mower around encountered obstructions on a programed basis. Left and right ground surface depression sensing members 19 and 20, respectively, function co-operatively with the servo-guidance apparatus to steer the mower around encountered ground surface depressions on a programed basis. The operation of these control circuits will be discussed more fully in connection with the description of FIG. 5 which follows below.

Figure 2:
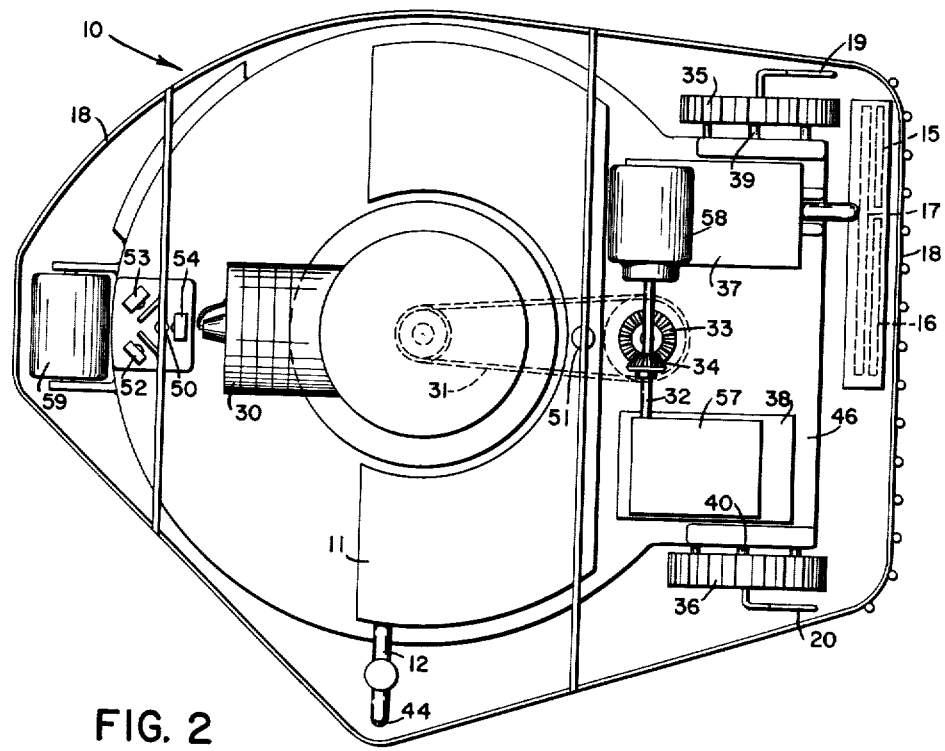
FIG. 2 is a top plan view of a power-driven rotary lawnmower equipped with the automatic guidance apparatus of the present invention.
Figure 4:
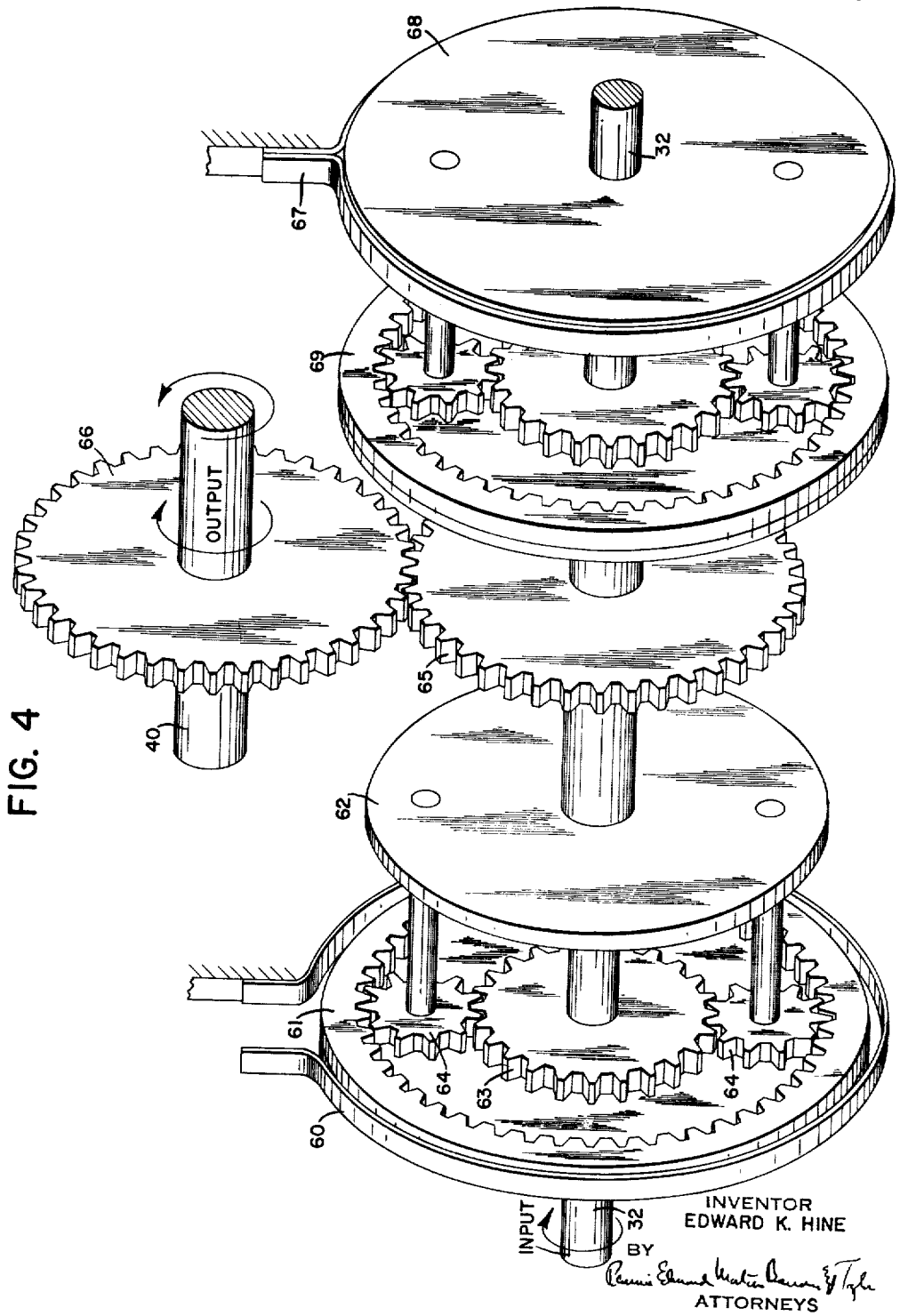
FIG. 4 is a perspective drawing showing the general features of an electrically controlled reversible power-transmission system utilized in the invention for power drive and steering control.

FIG. 2 shows in plan view the general arrangement of a motor-driven rotary lawnmower equipped with the automatic guidance system of the invention. Gasoline motor 30 provides driving power to belt 31 which in turn drives shaft 32 through bevel gears 33 and 34. Shaft 32 drives left tread 35 and right tread 36 through automatic transmissions 37 and 38, respectively, and output shafts 39 and 40, respectively. These transmission assemblies are identical and one operational embodiment which has been utilized satisfactorily is shown in FIG. 4.

Figure 3:
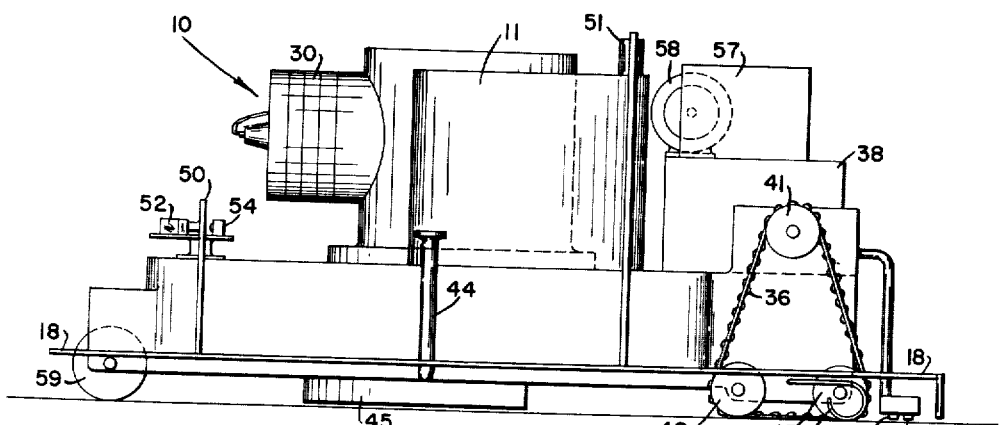
FIG. 3 is a side elevation view of the lawnmower shown in FIG. 2.

Referring to FIG. 3 it will be seen that the right-hand driving tread 36 is supported by drive pulley 41 and idler pulleys 42 and 43. Operation of the left driving tread (not shown) is similar to the right.

Water from supply tank 11 is deposited on the ground by nozzled pipe 12. Flexible guard 45 functions as a windshield protecting the nozzled water stream from the wind stream produced by the rotating grass cutter blade (not shown). Ground sensing probles 15, 16 and common ground probe 17 are shown mounted along the front left edge of the main mower frame 46. The center-line between probes 15 and 16 is advantageously separated from nozzle 44 by a portion of the width of the mower cutting blade to assure uniformly continuous mowing over the entire given area.

Wire guard ring 18 is yieldably supported by mounting points 50 and 51. Motion of the guard ring in response to physical contact with an obstruction located to the left, to the right or to the rear of the moving mower accordingly actuates left obstacle switch 52, right obstacle switch 53 or rear obstacle switch 54.

Left and right surface depression sensing probes are shown at 19 and 20, respectively. These probe members are advantageously spring loaded downwardly with respect to the mower frame to assure that they ride in contact with the ground surface. When a depression of predetermined angle of fall off is encountered during the mowing operation, a left or right fall-off switch (see FIG. 5) is actuated which automatically transfers the guidance control from the automatic mode of operation to a programed mode of operation. Operation of these circuits is fully described in connection with FIGS. 5 and 6.

The electrical control circuits for the guidance apparatus are mounted in box 57 and electrical power for the circuits is provided by generator 58 which is driven by shaft 32.

As shown in the drawing, the lawnmower is supported by left and right front tread assemblies and a rear wheel 59. Steering is effected by reversing the drive direction of the tread assemblies. The drive direction of each tread is advantageously controlled by an electrically operated automatic transmission of the type shown in FIG. 4. This reversible transmission as shown is a conventional system employing a pair of co-axial epicyclic gear trains with solenoid actuated braking means provided for selectively coupling the input drive shaft 32 to the output transmission shaft 40 (right) to effect either forward or reverse drive to the associated tread assembly. Assuming shaft 32 is rotated clockwise by the engine, when brake 60 is actuated by a small mechanical force produced by solenoid or other means (not shown), ring gear 61 is held in a fixed position causing cage 62 to be driven clockwise by sun gear 63 and planet gears 64. Output shaft 40 is accordingly rotated counterclockwise by gears 65 and 66. For reverse operation, brake 60 is relaxed and brake 67 is actuated by an assoicated solenoid (not shown) which is adapted to fixedly hold gear cage 68. Ring gear 69 is then rotated counter-clockwise and output shaft 40 is accordingly rotated clockwise.

Figure 5:
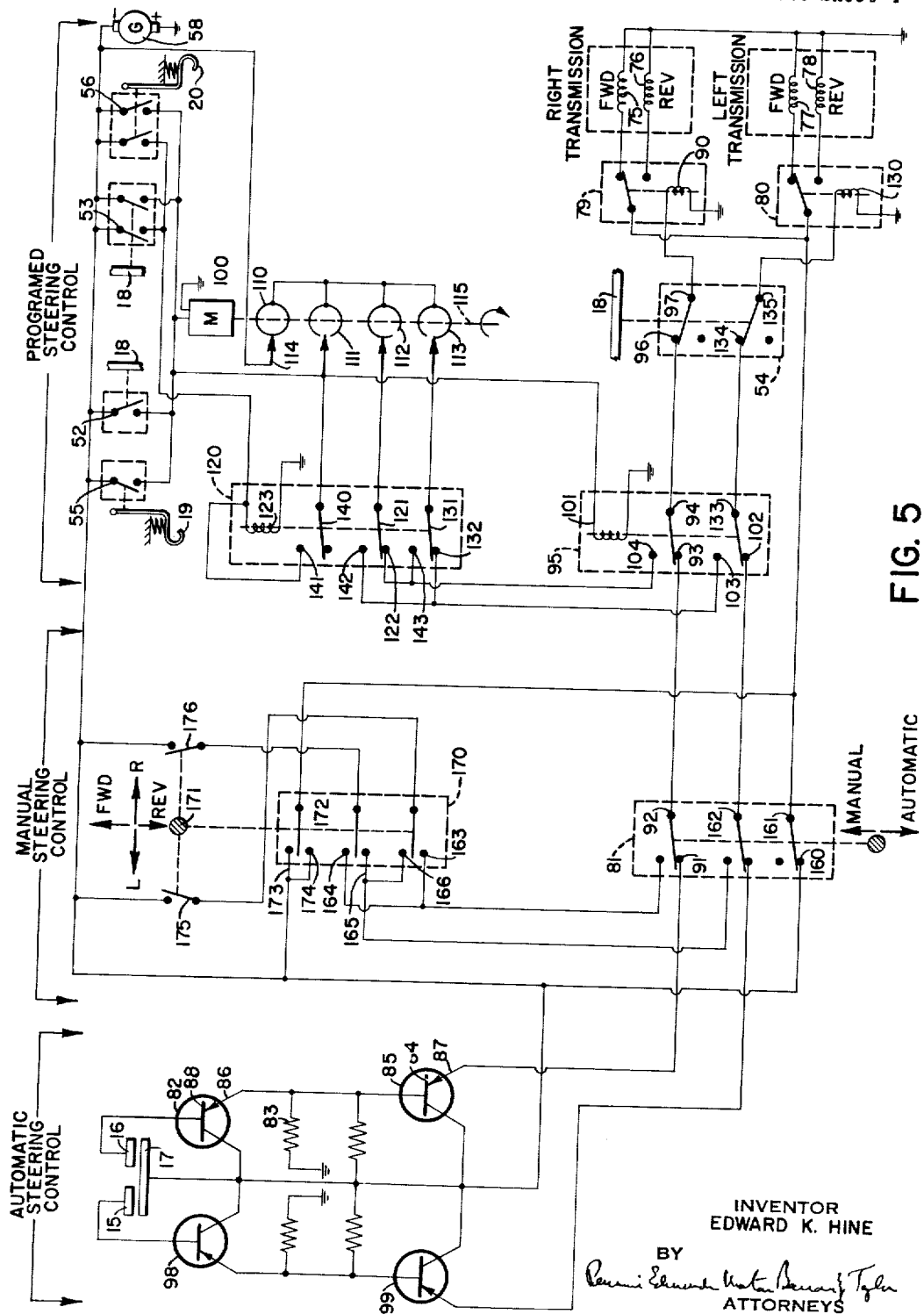
FIG. 5 is a schematic diagram showing the electrical control circuits of an automatic guidance system following the teachings of the invention.

The schematic diagram of FIG. 5 shows a preferred embodiment of the electrical guidance control circuits provided by the invention. As has been pointed out above, directional guidance of the lawnmower is effected by reversing the drive to one of the driving treads. Right forward and reverse solenoids 75 and 76, respectively, and left forward and reverse solenoids 77 and 78, respectively, are provided for actuating the brakes in the automatic transmissions. Single-pole double-throw switching relays 79 and 80 are provided for selecting forward or reverse drive operation on the left and right transmissions, respectively.

Three separate sets of control circuits are provided for selectively connecting the transmission solenoids to electrical generator 58 in order to afford the desired mode of guidance control. The three modes of operation provided are automatic, programed and manual. Each mode of operation will now be described in detail with particular reference being made to FIG. 5.

For automatic operation, the mower is moved to a position over the narrow water trace so that the common ground probe 17 is brought in contact with the trace and ground sensing probes 15 and 16 are disposed symmetrically on the left and right sides, respectively, of the trace. When triple-pole double-throw switch 81 is switched to the automatic position, the guidance system thereafter automatically steers the lawnmower along the desired water trace. Operation of the automatic guidance circuits is based upon the electrical sensing of increased soil conductivity when the trace (moistened soil) is disposed between the common probe and the left or right sensing probe. The left and right probes are advantageously spaced far enough apart so that neither comes in contact with the water trace until the mower veers off course. Since probe 17 is directly connected to the negative terminal of generator 58, an electrical current is caused to flow between that probe and sensing probes 15 and 16 back to the positive terminal of generator 58 (chassis ground). The magnitude of current flow to the respective probes is proportional to the soil conductance and the soil conductance varies as a function of soil moisture.

A pair of identical two-stage transistor amplifiers are provided for amplifying the separate currents which flow to the left and right probes. Since the amplifier circuits are identical, operation of only the right one will be described. Probe 16 is connected directly to the base 88 of transistor 82 and the current that flows between probe 17 and sensing probe 16 is returned to chassis ground through the base-emitter junction of transistor 82 and resistor 83. Transistor 82, connected as an emitter-follower, functions as a current amplifier. Base 84 of transistor 85 is directly connected to the emitter 86 of transistor 82. Transistor 85, connected as an emitter-follower, further serves to amplify the current output of transistor 82. The amplified current output from emitter 87 of transistor 85 is connected to coil 90 of the right transmission selector relay switch 79 via normally closed contacts 91, 92 of switch 81, through normally closed contacts 93, 94 of transfer relay 95 and normally closed contacts 96, 97 of rear-obstruction switch 54. When the mower veers to the left causing the water trace to be disposed between 16 and 17, the ground conductance between the probes is increased and the resulting increased current flow is amplified sufficiently to actuate relay 79 and reverse the drive to the right tread assembly. The resulting steering action rapidly moves the trace from between 17 and 16 causing the current flow to suddenly drop and deactuate relay 79. The right tread is thereby returned to normal forward drive operation.

It will be apparent from inspection that the left and right guidance control circuits, including the transistor amplifiers, are identical and that the two circuits function symmetrically so as to maintain the deposited water guidance trace substantially midway between probes 15 and 16. Thus when the lawnmower veers to the right, causing the water trace to be disposed between 15 and 17, the resulting increased current flow therebetween is amplified by transistors 98 and 99 causing relay 80 to be actuated. The left tread assembly is accordingly reversed for a sufficient time interval to recenter the trace between the probes and thereby return the mower to the desired guidance path.

The water trace detector assembly comprising probes 15, 16 and 17 is advantageously located ahead of the driving wheels as shown in FIG. 2 so that when guidance correction is effected by reversing the drive to one wheel, the detector assembly is rapidly repositioned over the water trace before the center of the machine is returned to the correct path. This action consititutes a damping effect on the steering servo-loop which permits faster steering action without the introduction of oscillatory overshoots.

It will be apparent from the preceding discussion that the automatic guidance system provided by the invention constitutes a closed-loop servo-mechanism positioning system. It should be noted that the guidance system functions as a self-programing device after it has been provided with an initial boundary defining program (trace). During normal automatic operation, the guidance system continuously follows a self-made program (water trace). When an obstruction is encountered such as a trace, etc., or a recession in the ground surface, switching apparatus is provided for automatically transferring the guidance control from the closed-loop automatic mode of operation to an open-loop fixed program type operation. In accordance with this aspect of the invention, the guidance system is provided with the necessary logic to navigate around the obstruction. Automatic transfer to the fixed programed operation is effected by the guard ring actuation of left or right obstacle switches 52 and 53, respectively, or by the actuation of left or right fall-off switches 55 and 56 by depression sensing probes 19 and 20, respectively. When any one of the obstruction or fall-off switches is actuated, power is applied to timing motor 100 as shown. At the same time coil 101 of relay 95 is energized transferring steering control from the automatic or manual systems, connected to contacts 93 and 102, to the programed steering system connected to contacts 103 and 104. Timing motor 100 rotates commutators 110, 111, 112 and 113 which are all mounted on a common drive shaft 115. Power is provided to the segment commutators 111, 112 and 113 via brush 114 and continuous commutator 110 as shown. Commutator 111 provides hold-in power for relay 95, transposition relay 120 and motor 100 for one complete revolution of the commutator assembly and uninterrupted transfer from automatic operation to programed operation for one program cycle.

When either the left fall-off switch 55 or left obstruction switch 52 is actuated, relay 120 remains unenergized and commutator 112 is connected to coil 90 of relay 79 via normally closed contacts 121, 122 of relay 120, through contacts 104, 94 of relay 95 and contacts 96, 97 of relay 54. Thus during the course of one revolution of timing motor 100, segment commutator 112 affords the programed control of the right-wheel transmission. This segment commutator causes the right wheel to run in reverse for a short interval of time, then causes the right wheel to revert to forward drive for a short interval of time (during break in segment), and finally causes the right wheel to run in reverse to the remainder of the cycle.

Segment commutator 113 provides the control program for the left wheel transmission. Power is supplied to solenoid 130 of relay 80 via contacts 131, 132 of relay 120, 103 and 133 of relay 95 and 134, 135 of relay 54. The left wheel is caused to run in reverse continuously until nearly the end of the programed period of steering when it is caused to revert to forward operation before the right-hand wheel has reverted to forward operation. When the timing motor has completed one revolution of the commutator assembly, the gap or dead segment is reached by the brush contacting commutator 111, stopping the timing motor and returning relay 95 to the automatic or manual steering control inputs.

The segments of commutators 112 and 113 are advantageously arranged to be adjustable with respect to the proportions of live and dead segments as well as with respect to the relative angular positions of the segments on the driven shaft. These adjustments afford a simple and flexible means for presetting an optimum program for the machine to follow for navigating around obstructions.

Operation of the programed steering circuits when either right obstruction switch 53 or right fall-off switch 56 is actuated is substantially the same as the left programed operation described above except that the output connections from commutators 112 and 113 are transposed. Thus the programed path followed during the right operation is a mirror image of that for the left operation (see FIG. 6). The program transposition is effected with the operation of relay 120 by the additional single-pole single-throw switch contacts provided on switches 53 and 56 as shown. Commutator 112, normally connected to coil 90 via normally closed contacts 121, 122 of relay 120, is switched to coil 130 via contacts 121, 142 when relay 120 is energized. In the same manner commutator 113 is switched from coil 130 to coil 90 by the switching of contact 131 from 132 to 143. Coil 123 of relay 120 is energized for one cycle of operation by the co-operative action of commutator 111 and holding contacts 140 and 141, thereby assuring the completion of one cycle of programed operation even for momentary actuations of the obstruction and fall-off switches.

Figure 6:
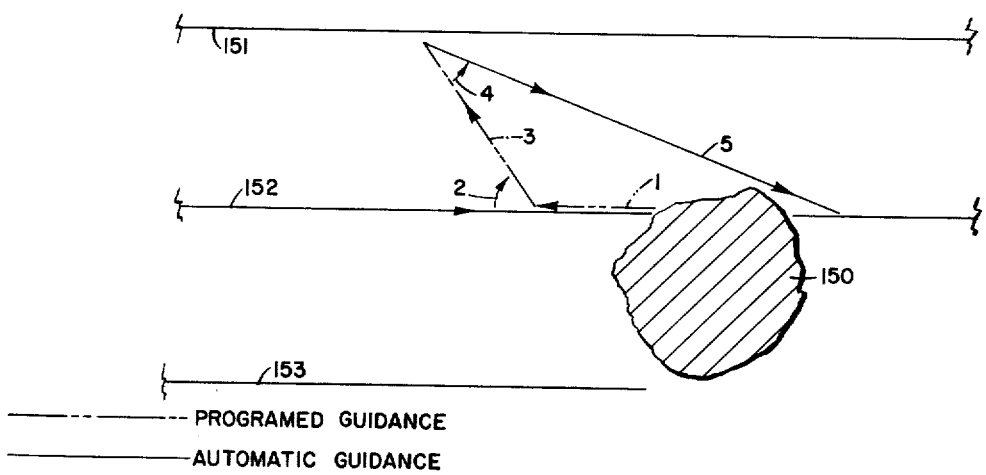
FIG. 6 is a diagrammatic drawing showing the operational path followed by the lawmower of FIG. 2 during the programed mode of operation.

The diagram of FIG. 6 shows the sequential paths followed by the lawnmower (not shown) during one cycle of programed operation following an encounter with a right-hand obstruction or depression 150. Line 151 represents a previously followed guidance trace, line 152 represents the trace which was followed leading to the encounter with 150 and line 153 represents a newly deposited trace. Upon making contact with 150, the actuation of switch 53 or 56 (FIG. 5) automatically transfers the lawnmower guidance system from the automatic mode of operation to the programed mode as described above, the programed path as shown is a mirror image of the path followed by the machine when a left obstruction or depression is encountered. The programed sequence of operations effecting guidance of the mower around 150 comprises four separate control operations. These are as follows:

|        | Right Wheel | Left Wheel |
| --- | --- | --- |
| Step 1 | Reverse operation | Reverse operation. |
| Step 2 | ----do---- | Forward operation to effect clockwise pivot. |
| Step 3 | ----do---- | Reverse operation. |
| Step 4 | Forward operation to effect counterclockwise pivot. | Do. |

Following the completion of the step 4 pivot, the mower is returned to automatic operation. Absent a water trace the mower moves straight forward along path 5 which converges with trace 152. When sensing probes 15, 16 and common probe 17 intercept the water trace, the automatic guidance system is once more controlled by the trace. When the encountered obstacle or depression occupies an unusually large area, the transfer from automatic to programed operation is repeated until the mower assumes a final path which clears the obstruction.

Referring to FIG. 5, double-pole double-throw switch 54, connected to guard ring 18, is actuated when the mower encounters an obstacle while moving in the reverse direction. Power is thereby removed from the coils of relays 79 and 80 causing the mower to return to forward drive.

Manually operated switch 81 permits the operator to transfer the guidance control system from the automatic steering mode described above to manual steering. When the selector switch is thrown to the manual position, power normally supplied to the brake-band solenoid circuits by contacts 160, 161 is removed therefrom causing the mower to remain at rest. At the same time contacts 92 and 162 are switched away from the respective emitter outputs of transistors 85 and 99 to contacts 163, 164 and 165, 166, respectively, on three-pole three-position switch 170. The operator steers the machine by manipulating steering rod 171 from a normal central rest position to forward or reverse positions and left or right positions as shown. When the rod is moved in either the forward or reverse direction, arm 172 of switch 170 is moved from a central rest position to engage either contact 173 or 174 thereby applying power to the brake solenoid control circuits.

When the steering rod is moved to the reverse direction, switches 170, 175 and 176 are all actuated and power is simultaneously applied to coils 90 and 130 through the indicated contacts of switch 170, switch 81, relay 95 and switch 54. The left and right switches 175 and 176, respectively, as indicated above, are operated conjointly with switch 170 to effect the desired steering operation. Thus when the rod is moved forward and to the right, steering switch 176 is actuated along with switch 170 causing the right wheel to run in reverse while the left wheel runs forward, producing thereby the desired right turn. In similar manner a left turn is effected by moving the steering rod forward and to the left. When the rod is moved to the rear and to the right, switches 176 and 170 are actuated, the left wheel is reversed and the right driven forward causing the mower to move to the rear and right. It may be readily seen that moving the steering rod to the left will cause the mower to move to the rear and to the left.

Although but one embodiment of the present invention has been illustrated and described, it will be apparent to those skilled in the art that various changes and modifications can be made in the electrical control circuits as well as in the mechanical arrangements without departing from the scope of the invention.

I claim:

1. Apparatus for automatically steering an automotive vehicle along a path defined by an electrically conductive fugitive ground trace, comprising a common ground contacting probe mounted on said vehicle and arranged to maintain continuous physical contact with the said ground trace, left and right trace sensing probes mounted symmetrically on said vehicle with respect to said common probe along an axis transverse the desired ground path for said vehicle, said trace sensing probes being mounted a predetermined distance apart and being arranged to maintain continuous contact with the respective left and right ground surfaces adjacent said trace, means for electrically energizing said probes to produce separate current flow between the said common probe and said left and right probes respectively, circuit means for producing left and right steering control signals from the respective currents flowing to the said left and right sensing probes, and electrically operable steering means responsive to said left and right steering control signals for guiding said vehicle along a path defined by the said trace.

2. Apparatus for automatically steering an automotive vehicle along a path defined by an electrically conductive fugitive ground trace, comprising a reservoir mounted on said vehicle for storing a supply of electrically conductive flowable material, delivery means associated with said reservoir for depositing a narrow trace of said material along a desired path of travel for said vehicle, electrically energizable sensing means mounted on said vehicle for producing steering control signals in response to lateral movement of said vehicle with respect to said trace, said sensing means being displaced laterally by a predetermined distance from said delivery means, and electrically operable steering means actuated by said steering control signals for guiding said vehicle along a trace deposited on a previous pass of the vehicle along a path adjacent to the path being followed.

3. Apparatus for automatically steering an automotive vehicle along a path defined by a deposited electrically conductive fugitive ground trace, comprising a common ground contacting probe mounted on said vehicle and arranged to maintain continuous physical contact with the said ground trace, left and right trace sensing probes mounted symmetrically on said vehicle with respect to said common probe along an axis transverse the desired ground path for said vehicle, said trace sensing probes being mounted a predetermined distance apart and being arranged to maintain continuous contact with the respective left and right ground surface adjacent said trace, means for electrically energizing said probes to produce separate current flow between the said common probe and said left and right probes respectively, circuit means for producing left and right steering control signals from the respective currents flowing to the said left and right sensing probes, means mounted on said vehicle for depositing an electrically conductive fugitive ground trace defining the future path of advance of said vehicle, said means being laterally displaced from said common ground contacting probe by a predetermined distance, and electrically operable steering means actuated by said steering control signals for guiding said vehicle along a trace deposited on a previous pass of the vehicle along a path adjacent to the path being followed.

4. A guidance system for steering an automotive vehicle, comprising apparatus for automatically steering said vehicle along a path defined by an electrically conductive ground trace, including electrically energizable sensing means mounted on said vehicle for producing automatic steering control signals in response to lateral movement of said vehicle with respect to said trace, with means mounted on said vehicle for depositing an electrically conductive ground trace defining the future path of advance of said vehicle; means for producing programed steering control signals including a plurality of electrically energizable switches and a timing motor for actuating said switches in accordance with a predetermined time sequence program; electrically operable steering means for said vehicle, said steering means being adapted to be controlled by selected steering control signals, a transfer relay switch for selectively connecting said steering means to either the said automatic steering control signals or the said programed steering control signals, switch means for simultaneously energizing said timing motor and said transfer relay switch whereby said vehicle guidance is switched from automatic operation to programed operation, and an obstruction sensing guard ring yieldably mounted on said vehicle and surrounding at least the forward portion thereof, said guard ring being operatively connected to actuate said switch means when an obstruction is contacted by the said ring.

5. A guidance system for steering an automotive vehicle, comprising apparatus for automatically steering said vehicle along a path defined by an electrically conductive ground trace, including electrically energizable sensing means mounted on said vehicle for producing automatic steering control signals in response to lateral movement of said vehicle with respect to said trace, with means mounted on said vehicle for depositing an electrically conductive ground trace defining the future path of advance of said vehicle; means for producing programed steering control signals including a plurality of electrically energizable switches and a timing motor for actuating said switches in accordance with a predetermined time sequence program; electrically operable steering means for said vehicle, said steering means being adapted to be controlled by selected steering control signals, a transfer relay switch for selectively connecting said steering means to either the said automatic steering control signals or the said programed steering control signals, switch means connected so as when actuated to simultaneously energize said timing motor and said transfer switch whereby said vehicle guidance is switched from automatic operation to programed operation, and a ground surface depression sensing member mounted on the forward part of said vehicle and spring loaded to maintain continuous contact with the ground surface ahead of said vehicle, said member being operatively connected to actuate said switch means when a ground surface depression of predetermined angle of fall off is encountered.

6. A guidance system for steering an automotive vehicle, comprising apparatus for automatically steering said vehicle along a path defined by an electrically conductive ground trace, including electrically energizable sensing means mounted on said vehicle for producing automatic steering control signals in response to lateral movement of said vehicle with respect to said trace, with means mounted on said vehicle for depositing an electrically conductive ground trace defining the future path of advance of said vehicle; means for producing programed steering control signals including a plurality of electrically energizable switches and a timing motor for actuating said switches in accordance with a predetermined time sequence program; electrically operable steering means for said vehicle, said steering means being adapted to be controlled by selected steering control signals, a transfer switch for selectively connecting said steering means to either the said automatic steering control signals or the said programed steering control signals, first and second switch means each being connected so as when individually actuated to simultaneously energize said timing motor and said transfer switch whereby said vehicle guidance is switched from automatic guidance operation to programed guidance operation, an obstruction sensing guard ring yieldably mounted on said vehicle and surrounding at least the forward portion thereof, said guard ring being operatively connected to actuate said first switch means when an obstruction is contacted by the said ring, and a ground surface depression sensing member mounted on the forward part of said vehicle and spring loaded to maintain continuous contact with the ground surface ahead of said vehicle, said member being operatively connected to operate said second switch means when a ground surface depression of predetermined angle of fall off is encountered.

7. A guidance system for steering an automotive vehicle, comprising apparatus for automatically steering said vehicle along a path defined by an electrically detectable ground trace, including electrically energizable sensing means mounted on said vehicle for producing automatic steering control signals in response to lateral movement of said vehicle with respect to said trace, with means mounted on said vehicle for depositing an electrically detectable ground trace defining the future path of advance of said vehicle; means for producing programmed steering control signals including a plurality of electrically energizable switches and an electrically operated timing control circuit for actuating said switches in accordance with a predetermined time sequence program; electrically operable steering means for said vehicle, said steering means being adapted to be controlled by select steering control signals, a transfer relay switch for selectively connecting said steering means to either of the said automatic steering control signals or the said programmed steering control signals, switch means for simultaneously energizing said timing control circuit and said transfer relay switch whereby said vehicle guidance is switched from automatic operation to programmed operation, and an obstruction sensing guard ring yieldably mounted on said vehicle and surrounding at least the forward portion thereof, said guard ring being operatively connected to actuate said switch means when an obstruction is contacted by the said ring.

8. A guidance system for steering an automotive vehicle, comprising apparatus for automatically steering said vehicle along a path defined by a radio-active fugitive ground trace, including electrically energizable sensing means mounted on said vehicle for producing automatic steering control signals in response to lateral movement of said vehicle with respect to said trace, with means mounted on said vehicle for depositing a radio-active fugitive ground trace defining the future path of advance of said vehicle; means for producing programmed steering control signals including a plurality of electrically energizable switches and a timing control circuit for actuating said switches in accordance with a predetermined time sequence program; electrically operable steering means for said vehicle, said steering means being adapted to be controlled by selected steering control signals, a transfer relay switch for selectively connecting said steering means to either the said automatic steering control signals or the said programmed steering control signals, switch means for simultaneously energizing said timing control circuit and said transfer relay switch whereby said vehicle guidance is switched from automatic operation to programmed operation, and an obstruction sensing guard ring yieldably mounted on said vehicle and surrounding at least the forward portion thereof, said guard ring being operatively connected to actuate said switch means when an obstruction is contacted by the said ring.

References Cited in the file of this patent

UNITED STATES PATENTS

| 2,074,251 | Braun | Mar. 16, 1937 |
| 2,339,291 | Paulus et al. | Jan. 18, 1944 |
| 2,742,099 | Hagen | Apr. 17, 1956 |
| 2,750,583 | McCullough | June 12, 1956 |
| 2,751,030 | Null | June 19, 1956 |
| 2,824,616 | Knight et al. | Feb. 25, 1958 |
| 2,847,080 | Zworykin et al. | Aug. 12, 1958 |

FOREIGN PATENTS

| 559,154 | Canada | June 24, 1958 |

UNITED STATES PATENT OFFICE
CERTIFICATE OF CORRECTION

Patent No. 3,095,939                               July 2, 1963

Edward K. Hine

It is hereby certified that error appears in the above numbered patent requiring correction and that the said Letters Patent should read as corrected below.

Column 1, line 58, for "lawmower" read -- lawnmower --; column 3, line 7, for "probles" read -- probes --; line 39, after "of", first occurrence, insert -- one of --; column 5, line 10, for "trace" read -- tree --; column 7, line 74, for "surface" read -- surfaces --.

Signed and sealed this 7th day of January 1964.

(SEAL)
Attest:

ERNEST W. SWIDER
Attesting Officer

EDWIN L. REYNOLDS
Acting Commissioner of Patents